Patented Oct. 27, 1953

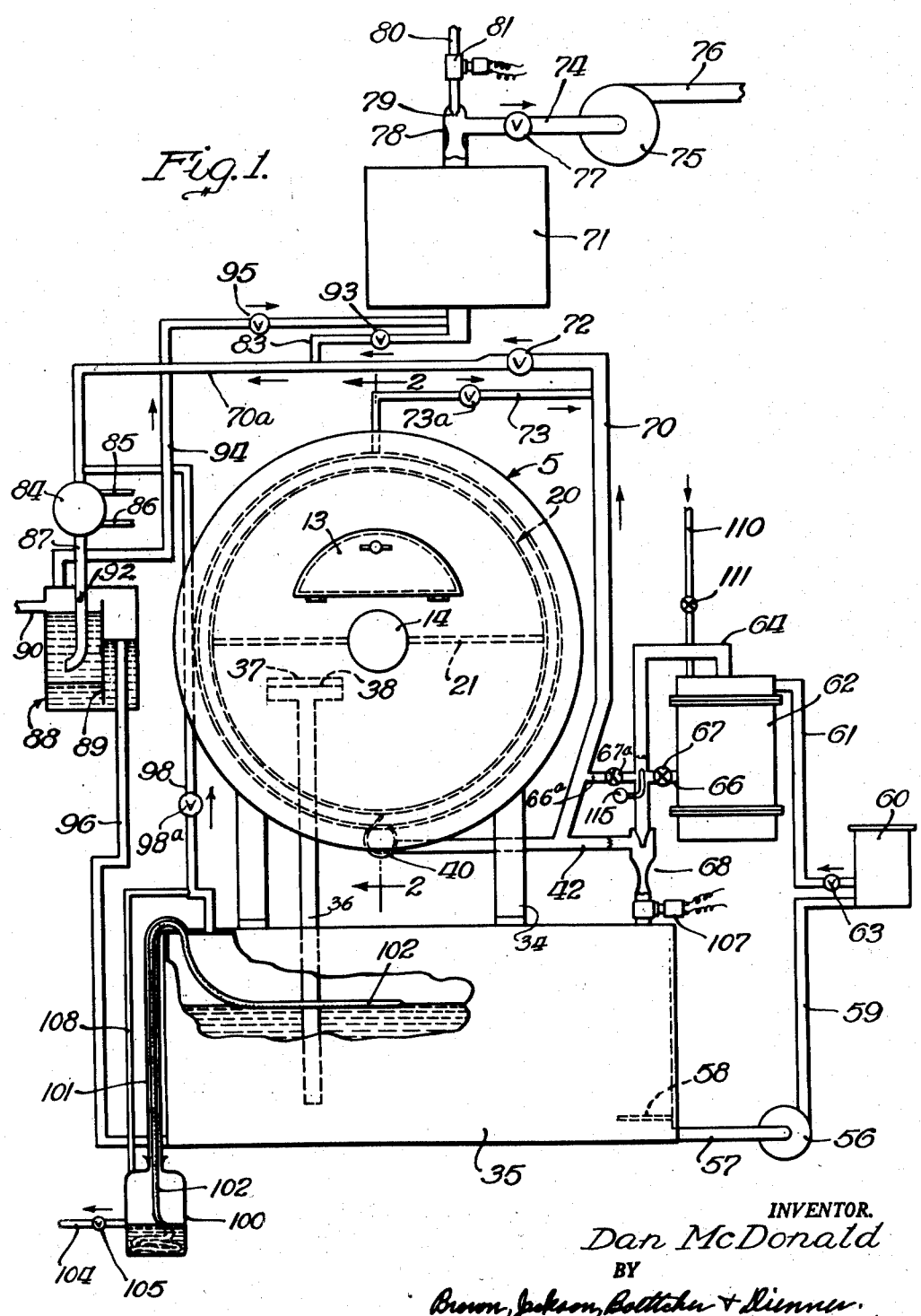

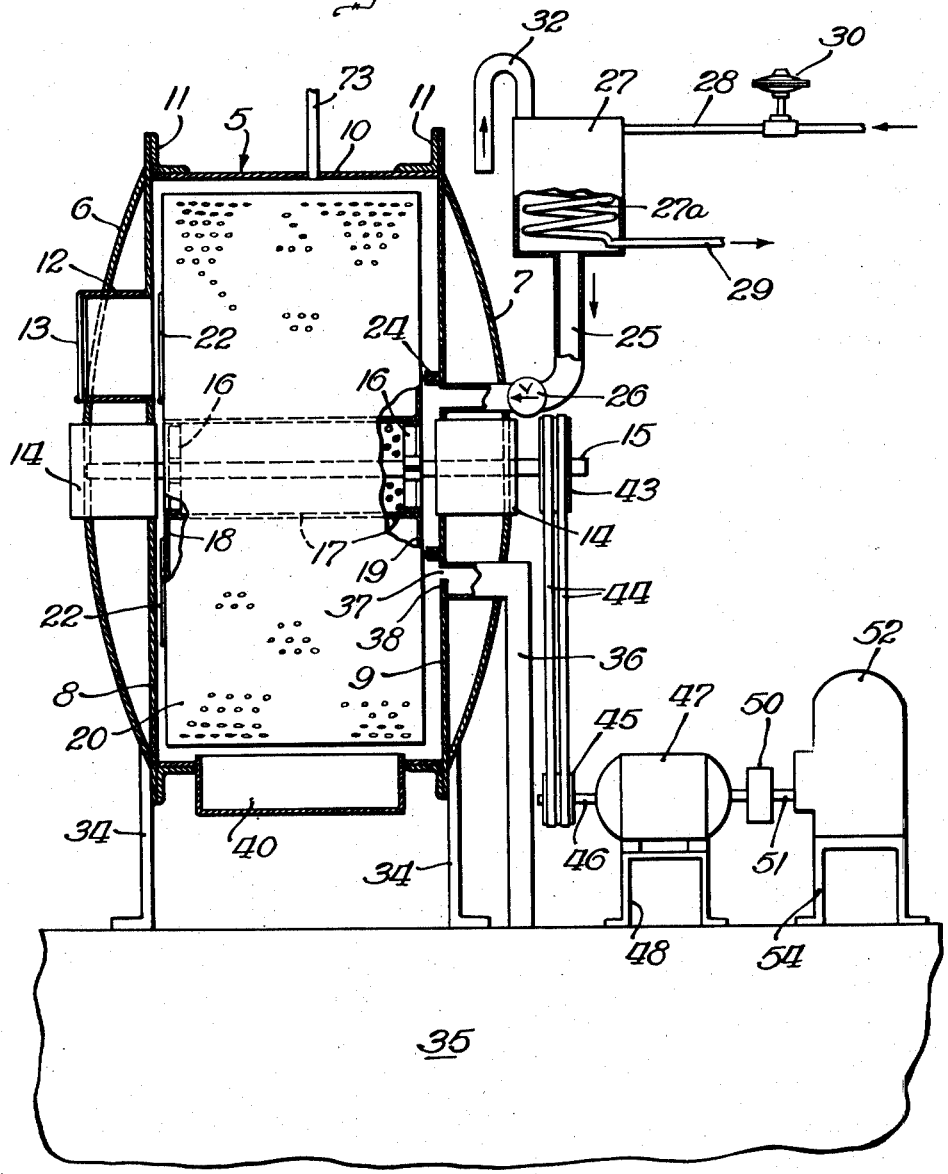

2,656,696

UNITED STATES PATENT OFFICE 2,656,696

APPARATUS FOR COLD DRY CLEANING

Dan McDonald, Aurora, Ill., assignor to Aurora Research Industries, Inc., Aurora, Ill., a corporation of Illinois Application December 11, 1951, Serial No. 261,023

17 Claims. (Cl. 68—18)

This invention relates to cold dry cleaning apparatus for use in the dry cleaning of clothes and analagous articles in suitable solvents, preferably chlorinated hydrocarbons.

Dry cleaning apparatuses are well known and extensively used. In general, the apparatuses presently in use are rather complicated both in construction and operation, employ a multiplicity of control valves, are expensive and are not well suited for using chlorinated hydrocarbon solvents due to the excessive wastage of the solvent employed in the cleaning operation.

My invention is directed to the provision of dry cleaning apparatus of comparatively simple construction and operation, which is comparatively inexpensive, is well suited for using cold or unheated chlorinated hydrocarbon solvents, preferably carbon tetrachloride or perchlorethylene, and employs the minimum number of control valves. The apparatus of my invention provides a washer of simple, compact and inexpensive construction having associated means for supplying thereto air, preferably heated air, in adequate volume for removing all traces of solvent from the articles under treatment after completion of the washing operation. The solvent is delivered to the washer from the storage tank, to which it is returned from the washer, and means is provided for continuously removing water from the upper surface of the solvent in the storage tank, which is of importance as guarding against injury to the articles under treatment. The solvent passes from the storage tank through a filter and thence to the washer. It is desirable, at times, to open the filter for inspection, repair or replacement of parts, or for removal of filter powder which may accumulate therein in excessive amount. It is desirable before opening the filter that all solvent, particularly chlorinated hydrocarbon, be removed therefrom, both to guard against wastage of solvent and also to prevent escape of solvent in objectionable amount to the atmosphere, especially where the solvent used is of a character to be noxious. A further feature of my invention is the provision of means whereby the filter may be effectively steamed so as to remove the solvent therefrom before opening of the filter. The solvents used in the apparatus of my invention are preferably, as noted, chlorinated hydrocarbon solvents, such as carbon tetrachloride and perchlorethylene. The vapors of such solvents are heavier than air and tend to settle to the bottom of the washer during the deodorizing operation. I provide means whereby the solvent vapors are removed from the washer at the bottom thereof, which is advantageous in substantially reducing the time required for deodorizing. Further objects and advantages of my invention will appear from the detail description.

In the drawings:

Figure 1 is a semi-diagrammatic view, partly in section and partly in elevation, with certain parts broken away, of a dry cleaning apparatus embodying my invention; and Figure 2 is a sectional view, on an enlarged scale taken substantially on line 2—2 of Figure 1, certain parts being shown in elevation and certain other parts being shown partly broken away and in section, the solvent storage tank being shown fragmentarily.

The apparatus includes a washer 5 of cylindrical form having outwardly bulged front and back heads 6 and 7, respectively, spaced from flat end walls 8 and 9 between which is disposed an annular sheet metal strip constituting the circumferential wall 10 of the body of the washer. The heads 6 and 7 are suitably secured, conveniently by welding, to the end walls 8 and 9, and the end walls 8 and 9 and the circumferential wall 10 are all secured, conveniently by welding, to annular frame members 11 of angle cross section. A collar 12 extends from end wall 8 through the front head 6 defining an opening of suitable form and size into the interior of the housing 5, the outer end of such opening being closed by a door 13 mounted and secured in any suitable known manner.

Bearing housings 14 extend between the end walls 8 and 9 and the heads 6 and 7 and are suitably secured thereto, conveniently by welding. A shaft 15 is rotatably mounted in suitable bearings (not shown) in the housings 14, within which may also be provided suitable known seals effective for preventing escape of solvent vapors about shaft 15. This shaft 15 is coaxial with housing 5 and has secured thereto spiders 16 secured in the ends of a perforated sleeve 17 disposed in concentric spaced relation to shaft 15. Sleeve 17 is secured at its ends in the front and back end wall 18 and 19, respectively, of a perforated drum 20 disposed within housing 5. This drum is divided by a diametrical partition 21 into two compartments access to which is had by doors 22 normally closing corresponding openings in front end wall 18 of drum 20, the doors 22 being mounted and secured in any suitable known manner.

A labyrinth seal 24 is provided between end wall 9 of housing 5 and the adjacent end wall 19 of drum 20, in concentric spaced relation to the adjacent end of sleeve 17. An air supply conduit 25 opens into the space enclosed by seal 24, the corresponding area of end wall 19 of drum 20 being imperforate. Conduit 25 is provided with a check valve 26 of suitable known type opening toward the washer and closing outwardly therefrom. Conduit 25 opens at its other or outer end into a casing 27 enclosing a heating coil 27a to which steam is admitted through a pipe 28, the condensate being discharged through a pipe 29. A regulator 30, of known type, in pipe 28 controls the admission of steam so as to maintain the temperature of the air entering the washer at proper value to guard against injury to the articles under treatment. As will be understood, the temperature of the entering air may be varied by proper adjustment of the regulator 30, depending upon the nature of the articles being deodorized. Air is admitted to casing 27, from the atmosphere, through a suitable conduit 32 opening into the top of casing 27.

The washer 5 is mounted, conveniently by brackets 34, on a suitable support, which may be a solvent storage tank 35. An overflow conduit 36 opens through the back end wall 9 of washer 5, below and adjacent the seal 24, through a slot 37 defined in part by a baffle element or weir 38 of wall 9. At its lower end the conduit 36 opens into tank 35 a short distance below the bottom thereof, as shown in Figure 1. The washer 5 is provided, at the bottom thereof, with an upwardly opening discharge manifold 40 from which extends a refill and discharge conduit 42. A multiple V pulley 43 is secured on the rearward end of shaft 15 and receives belts 44 passing about a multiple V pulley 45 secured on shaft 46 of an electric motor 47 of suitable known type mounted on a bracket 48 on tank 35. The rearward end of shaft 46 is connected, by an over running or slip clutch 50, of suitable known type, to shaft 51 of a unit 52, of suitable known type, comprising a motor and speed reducing means, mounted by bracket 54 on tank 35. During the washing operation the shaft 15 is driven at relatively low speed by the unit 52 through shaft 51, clutch 50 and shaft 46 of motor 47, and upon completion of the washing operation the shaft 15 is driven at relatively high speed by the motor 47 for expelling solvent from the articles under treatment by centrifugal force; as appears more fully later.

A continuously operating pump 56 has its intake connected, by a conduit 57, to tank 35 at one end and adjacent the bottom thereof, beneath a baffle 58 within tank 35. The discharge of pump 56 is connected by a conduit 59 to a filter powder box or container 60, the outlet of which is connected by a conduit 61 to the inlet of a filter 62 of suitable known type. The conduit 61 is provided with a check valve 63 opening toward filter 62 and closing toward the powder container 60, to prevent back flow of solvent from the filter to the powder box or container. The outlet of filter 62 is connected by a conduit 64 to the top of tank 35. A drain nipple 66, provided with a normally closed manually operated valve 67, connects the filter 62, at a suitable distance above the bottom thereof, to the conduit 64. A second nipple 66a, provided with a normally closed manually operated valve 67a, connects conduit 64 to conduit 70. The conduit 64 is provided, a short distance above tank 35, with Venturi ejector 68 of suitable known type into the suction of which opens the conduit 42.

A solvent vapor take-off conduit 70 is connected at its lower end to the conduit 42 and at its upper end, by a supplementary conduit 70a, to the inlet of a condenser 84 of suitable known type. The supplementary conduit 70a is connected, by a conduit 83, to the inlet of a carbon adsorber 71 of suitable known type. The conduit 83 is provided with a check valve 93 opening toward conduit 70a and closing toward adsorber 71. The conduit 70 is provided with a check valve 72 opening toward condenser 84 and closing toward the conduit 42. An air outlet conduit 73 connects the housing of washer 5, at the top thereof, to the conduit 70 between check valve 72 and conduit 42. Conduit 73 is provided with a check valve 73a opening toward conduit 72 and closing toward washer 5. The outlet of the adsorber 71 is connected by a conduit 74 to a continuously operating blower 75 having a discharge conduit 76 leading to atmosphere. The conduit 74 is provided with a check valve 77 opening toward blower 75 and closing toward adsorber 71. Conduit 74 opens into the suction of a Venturi ejector 78 leading from the outlet of carbon adsorber 71 and comprising a nozzle 79 at the inner end of a steam pipe 80 and extending toward the outlet of adsorber 71. The steam pipe 80 is controlled by a normally closed solenoid valve 81 of suitable known type.

The condenser 84 is of suitable known type and is cooled by water circulated therethrough through pipes 85 and 86. The outlet of the condenser 84 is connected by a conduit 87 to a gravity water separator 88 of known type having an interior baffle 89 the upper and lower ends of which are spaced a short distance from the top and the bottom walls of the separator 88. The conduit 87 extends downward within the separator 88 well below the normal water level thereof, at which a discharge pipe 90 opens into separator 88 for continuously discharging water therefrom, this pipe 90 being provided, in practice, with a U trap (not shown). The conduit 87 is provided with suitable openings, one of which is shown at 92, disposed above the water level in the separator 88 for escape thereinto of entrained gases and vapors passing through the conduit 87. A conduit 94 extends from the top of separator 88, at the water side thereof, to the inlet of adsorber 71. This conduit 94 is provided with a check valve 95 opening toward adsorber 71 and closing toward the water separator 88. A conduit 96 connects the separator 88 to storage tank 35 for returning to the latter solvent from separator 88. The solvent used has a greater specific gravity than water, as above noted, and separates therefrom by gravity in the separator 88, the water being continuously discharged through pipe 90 and the solvent being returned through the conduit 96 to tank 35, as will be clear from what has been said. An equalizer conduit 98 connects conduit 70a, adjacent the inlet of condenser 84, to the top of tank 35, for removing from the latter any vapors evolved therein or delivered thereto and for maintaining the pressure in the separator 88 equal to or greater than the pressure in the tank 35. The conduit 98 is provided with a check valve 98a opening toward condenser 84 and closing toward tank 35. Conduit 98 is of proper size—about one-quarter inch in diameter—to perform its equalizing function while avoiding withdrawal of solvent vapor from the washer 5 through tank 35, with resultant delivery of solvent saturated air through conduit 98 during the deodorizing step. During deodorizing, the solvent vapor is withdrawn from the bottom of washer 5 through conduits 42 and 70, as will appear more fully later.

The solvent used preferably is a chlorinated hydrocarbon solvent of greater specific gravity than, and immiscible in, water. It will be assumed, for purposes of description, that the solvent used is perchlorethylene. A container 100 is disposed exterior of and below the tank 35. A tube 101 extends from the top of container 100 to the top of tank 35 and opens into the latter. A wick member 102 extends from within container 100 upward through tube 101 into the tank 35, the length of member 102 within tank 35 being such that it lays at all times upon the surface of the solvent within the tank. Since the solvent is immiscible with water and is of greater specific gravity than water, any water which enters the tank with the solvent will float upon the solvent so as to be absorbed by the wick member 102, which is formed of a material, conveniently cotton, which is highly absorbent of water and will float when water wet upon the solvent. The lower portion of wick member 102 is at all times submerged in water within the container 100, assuring that wick member 102 is maintained saturated with water. The container 100 is provided with an overflow pipe 104 provided with a lightly loaded check valve 105 of known type, which opens and closes away from and toward the container 100. In that manner, the water within container 100 is maintained at about the level shown. The wick member 102 readily absorbs the water on the surface of the solvent and conveys it by capillarity to the container 100. In addition, by extending the outer end of the wick member 102 downward below the level of the solvent in tank 35, the water flowing downward through the wick member into container 100 exerts a siphoning action which expedites removal of water by the wick member 102 from the surface of the solvent. In that manner, the wick member 102 acts both by capillarity and by siphoning to remove continuously water from the surfaces of the solvent in tank 35. In that manner, I guard against accumulation of water in the storage tank 35 and risk of water being drawn therefrom into the washer 5 with resultant injury to the articles under treatment, if the solvent in storage tank 5 is low, and also render it practicable to use a comparatively small solvent storage tank.

In the use of the apparatus of my invention, the articles are placed within the drum 20, to which solvent is delivered by pump 56 from filter 62, by closing a solenoid control valve 107 in conduit 64, between tank 35 and the Venturi ejector 68. The overflow weir 38 maintains the desired level of solvent within the washer, and during the washing operation, which requires from three to five minutes, the drum 20 is rotated at low speed, approximately twenty-six R. P. M., by the unit 52. While the articles are being washed, the carbon adsorber 71 may be regenerated by opening the solenoid valve 81 and admitting steam thereto. The flow of steam from nozzle 79 through the ejector 78 produces a subatmospheric pressure in conduit 74 effective for closing valve 77 and holding it closed against the suction effect of blower 75. The steam flowing through the adsorber 71 removes the adsorbed solvent therefrom and the resultant solvent vapor and steam passes through the conduit 83 and the supplementary conduit 70a to the condenser 84, the condensate being delivered to the separator 88. The check valve 95 in conduit 94 closes during regeneration of carbon adsorber 71 and prevents flow through conduit 94 of solvent vapor and steam from adsorber 71.

The air displaced from the washer by the entering solvent flows through the conduit 73 to conduit 70 and thence to the condenser 84. Upon completion of the washing operation, the solenoid valve 107 is opened, the pump 56 remaining in operation, for draining the free solvent from the washer. The solvent from filter 62 is then discharged through the Venturi ejector 68 into tank 35 and induces rapid flow of solvent through conduit 42, thereby expediting draining of washer 5. After the free solvent has been drained from the washer, drum 20 is rotated at relatively high speed, approximately four hundred R. P. M., by the motor 47, thus removing by centrifugal action the major portion of the solvent remaining in the articles, so as to reduce the amount of such solvent from approximately three hundred percent of the normal dry weight of the articles to approximately twenty-five percent.

Upon completion of the centrifuging operation, which requires from seven to ten minutes, regeneration of the adsorber 71 having been completed and the solenoid valve 81 being closed, check valves 77 and 95 open and the blower 75 again becomes effective. The drum 20 is then rotated at relatively low speed, as during the washing operation, and the blower 75 is then effective for drawing into perforated sleeve 17, through conduit 25, heated air in adequate volume. This heated air, at a temperature from about 200° to 250° F., passes through the articles under treatment and quickly removes the remaining solvent therefrom, this deodorizing step being completed in from ten to fifteen minutes. The resultant solvent vapor is withdrawn through the conduits 42, 70 and 70a, the condenser 84, water separator 88, conduit 94 and adsorber 71. The withdrawn solvent vapor is, in major portion at least, condensed in the condenser 84. Any solvent vapor withdrawn from separator 88 is adsorbed in the adsorber 71 and the air discharged from blower 75 is solvent free and odorless.

The solvent vapors, being heavier than air, tend to sink to the bottom of the washer and are rapidly removed through the conduits 42, 70 and 70a, condenser 84, separator 88, conduit 94 and adsorber 71. Tests under actual operating conditions have demonstrated that the amount of air required to deodorize completely the materials when the solvent vapors are withdrawn from the bottom of the washer is but one tenth of the amount required when the solvent vapors are withdrawn from the top of the washer. There is thus a distinct advantage in removing the solvent vapors from the lower portion or bottom of the washer, as will be clear from the above. Any air or non-condensable vapors entering the separator 88 will be withdrawn therefrom, together with any solvent vapors entering separator 88, through the conduit 94 and the adsorber 71, in which the solvent vapors, if present, are adsorbed as above stated. Also, any vapors evolved in, or discharged into, the tank 35 are withdrawn therefrom through the conduit 98, condenser 84, separator 88, conduit 94 and adsorber 71, and are adsorbed in the adsorber 71, as will be clear from what has been said. The check valve 26 in conduit 25 effectively prevents escape of solvent vapors from the washer to atmosphere. It will be seen that substantially complete recovery of solvent vapors is effected and no appreciable loss of solvent to atmosphere occurs, which is an important consideration in the dry cleaning industry. Preferably, an equalizer tube 108 connects the container 100 to conduit 98 for equalizing the pressure in tank 35 and container 100, to assure most efficient operation of the wick member 102. As will be noted, this wick member 102 is completely enclosed from the atmosphere to guard against evaporation of water therefrom and assure the combined siphoning and capillary action thereof above mentioned, for removing water from the solvent within tank 35.

A steam pipe 110 is connected to filter 62, for admitting steam thereto, this pipe being controlled by a manually operated valve 111 which normally is closed. When it is desired to open the filter 62, the pump 56 is stopped and valve 67 is opened so as to drain solvent from the filter into tank 35, through nipple 66, the lower portion of conduit 64 and ejector 68, the solenoid valve 107 remaining open. After that has been done, the valve 107 is closed, valve 111 is then opened, permitting entry of the steam into the filter 62 and valve 67a is opened, valve 67 remaining open. The steam and the resultant azeotropic vapor flow from filter 62 through pipe 64, nipples 66 and 66a, and conduit 70 and 70a into the condenser 84. A thermometer 115 is mounted in pipe 64 to indicate the temperature of the vapors and gases flowing therethrough. When this thermometer indicates a temperature of from 190° F., to 212° F., preferably the latter, that is an indication that all of the solvent which remained in the filter 62 after draining thereof has been vaporized and removed from the filter. The filter may then be opened without loss of solvent and without risk to the operator in cases where the solvent used is noxious. The solvent vapor from the filter 62, during steaming thereof, flows to the condenser 84, in which it is condensed and the solvent is delivered through conduit 87 to the separator 88 and thence, through conduit 96, to storage tank 35. In that manner I guard against loss of solvent when it becomes necessary or desirable to open the filter, thereby contributing further to saving of solvent which is comparatively expensive.

It will be understood that changes in detail may be resorted to without departing from my invention, and I intend to include all such variations, as fall within the scope of the appended claims, in this application in which the preferred form only of my invention has been disclosed.

I claim:

1. In dry cleaning apparatus, a washer comprising a housing, a perforated drum rotatably mounted in said housing, means for admitting air to said drum substantially axially thereof while guarding against escape to atmosphere of vapors from said drum, a refill and discharge conduit opening into said housing adjacent a bottom portion thereof, selective means for continuously delivering a chlorinated hydrocarbon solvent through said conduit and to said housing or for discharging solvent from said housing through said conduit, an overflow conduit opening into said housing above the opening of said refill and discharge conduit, a solvent vapor take-off conduit extending from said refill and discharge conduit, suction means connected to said take-off conduit, and a check valve in said take-off conduit opening toward said suction means and closing toward said discharge and refill conduit.

2. In dry cleaning apparatus, a washer comprising a housing, a perforated drum rotatably mounted in said housing, an air supply conduit communicating with said drum substantially axially thereof, a check valve in said conduit opening toward and closing away from said drum, a refill and discharge conduit opening into said housing adjacent a bottom portion thereof, selective means for continuously delivering a chlorinated hydrocarbon solvent through said conduit and to said housing or for discharging solvent from said housing through said conduit, an overflow conduit opening into said housing above the opening of said refill and discharge conduit, a solvent vapor take-off conduit extending from said refill and discharge conduit, suction means connected to said take-off conduit, and a check valve in said take-off conduit opening toward said suction means and closing toward said discharge and refill conduit.

3. In dry cleaning apparatus, a washer comprising a housing, a perforated drum rotatably mounted in said housing, means for admitting air to said drum substantially axially thereof while guarding against escape to atmosphere of vapor from said drum, a refill and discharge conduit opening into said housing adjacent a bottom portion thereof, selective means for continuously delivering a chlorinated hydrocarbon solvent through said conduit and to said housing or for discharging solvent from said housing through said conduit, an overflow conduit opening into said housing above the opening of said refill and discharge conduit, a solvent vapor take-off conduit extending from said refill and discharge conduit, suction means connected to said take-off conduit, a check valve in said take-off conduit opening toward said suction means and closing toward said discharge and refill conduit, and an air take-off conduit connecting the top of said housing to said take-off conduit between said check valve and said refill and discharge conduit.

4. In dry cleaning apparatus, a washer for receiving articles to be cleaned and a chlorinated hydrocarbon solvent, a carbon adsorber, a solvent vapor take-off conduit communicating with said washer adjacent a bottom portion thereof and with an inlet of said carbon adsorber, suction means connecting to an outlet of said carbon adsorber, and a check valve in said conduit opening toward and closing away from said carbon adsorber.

5. In dry cleaning apparatus, a washer for receiving articles to be cleaned and a chlorinated hydrocarbon solvent, a water-solvent separator, a condenser having an outlet connected to said separator, a solvent vapor take-off conduit communicating with said washer adjacent a bottom portion thereof and with an inlet of said condenser, a check valve in said conduit opening toward and closing away from said condenser, a carbon adsorber, a second conduit connecting said separator above the water level therein to an inlet of said carbon adsorber, and suction means connected to an outlet of said carbon adsorber.

6. In dry cleaning apparatus, a washer for receiving articles to be cleaned and a chlorinated hydrocarbon solvent, a water-solvent separator, a condenser having its outlet connected to said separator, a solvent vapor take-off conduit communicating with said washer adjacent a bottom portion thereof and with an inlet of said condenser, a check valve in said conduit opening toward and closing away from said condenser, a carbon adsorber, a second conduit connecting said separator above the water level therein to an inlet of said carbon adsorber, a check valve in said second conduit opening toward said carbon adsorber and closing toward said separator, a third conduit connected to the inlet of said carbon adsorber and to said first conduit between said condenser and said check valve in said first conduit, a check valve in said third conduit opening toward said first conduit and closing toward said carbon adsorber, a steam admitting Venturi ejector opening into an outlet of said carbon adsorber for optionally ejecting steam into said carbon adsorber and thereby creating a suction in the outlet of said carbon adsorber, suction means, a fourth conduit connecting the suction of said ejector to an intake of said suction means, and a check valve in said fourth conduit opening toward said suction means and closing toward said ejector.

7. In dry cleaning apparatus, a washer, a storage tank for a chlorinated hydrocarbon solvent, a filter, a pump having its intake connected to said tank and its discharge connected to an inlet of said filter, selective means for connecting an outlet of said filter to said washer or to said tank and comprising means for optionally draining said filter to said tank, and means for admitting steam to said filter and taking-off therefrom the resultant azeotropic solvent vapor for removing from said filter any solvent remaining therein after draining thereof.

8. In dry cleaning apparatus, a washer, a storage tank for a chlorinated hydrocarbon solvent, a filter, a filter powder container, a conduit connecting an outlet of said container to an inlet of said filter, a pump having its intake connected to said tank and its discharge connected to an inlet of said container, a check valve in said conduit opening toward said filter and closing toward said container, selective means for connecting an outlet of said filter to said washer or to said tank and comprising means for optionally draining said filter to said tank, and means for admitting steam to said filter and taking-off therefrom the resultant azeotropic solvent vapor for removing from said filter any solvent remaining therein after draining thereof.

9. In dry cleaning apparatus, a washer, a storage tank for a chlorinated hydrocarbon solvent, a filter, a pump having its intake connected to said tank and its discharge connected to an inlet of said filter, selective means for connecting an outlet of said filter to said washer or to said tank and comprising means for optionally draining said filter to said tank, a condenser, a carbon adsorber having its inlet connected to an outlet of said condenser, a steam supply pipe connected to said filter for admitting steam thereto, an equalizer conduit connecting said tank above the solvent level therein to an inlet of said condenser, and means for optionally connecting said filter to the inlet of said condenser for delivering to the latter azeotropic solvent vapors evolved in said filter incident to admission of steam thereto.

10. In dry cleaning apparatus, a washer, a storage tank for a chlorinated hydrocarbon solvent, an overflow from said washer to said tank, a filter, a pump having its intake connected to said tank and its discharge connected to an inlet of said filter, a solvent return conduit connecting an outlet of said filter to said tank, a refill and discharge conduit connected to a bottom portion of said washer and to said return conduit, a control valve in said return conduit between said tank and said refill and discharge conduit, a carbon adsorber, suction means, an outlet conduit of said adsorber connected to said suction means, a check valve in said outlet conduit opening toward said suction means and closing toward said adsorber, means comprising an ejector in said outlet conduit between said check valve and said adsorber for optionally admitting steam to the latter, a water-solvent separator, a condenser having its outlet connected to said separator, a solvent vapor take-off conduit connecting said refill and discharge conduit to an inlet of said condenser, a check valve in said take-off conduit opening toward said condenser and closing toward said refill and take-off conduit, a solvent return conduit connecting said separator to said tank, a take-off conduit connecting said separator above the water level therein to an inlet of said carbon adsorber, a check valve in said last mentioned take-off conduit opening toward said carbon adsorber and closing toward said separator, and a vapor and steam conduit connecting the inlet of said adsorber to the inlet of said condenser and provided with a check valve opening toward said condenser and closing toward said adsorber.

11. In dry cleaning apparatus, a washer, a storage tank for a chlorinated hydrocarbon solvent, an overflow from said washer to said tank, a filter, a pump having its intake connected to said tank and its discharge connected to an inlet of said filter, a solvent return conduit connecting an outlet of said filter to said tank, a refill and discharge conduit connected to a bottom portion of said washer and to said return conduit, a control valve in said return conduit between said tank and said refill and discharge conduit, a carbon adsorber, suction means, an outlet conduit of said adsorber connected to said suction means, a check valve in said outlet conduit opening toward said suction means and closing toward said adsorber, means comprising an ejector in said outlet conduit between said check valve and said adsorber for optionally admitting steam to the latter, a water-solvent separator, a condenser having its outlet connected to said separator, a solvent vapor take-off conduit connecting said refill and discharge conduit to an inlet of said condenser, a check valve in said take-off conduit opening toward said condenser and closing toward said refill and take-off conduit, a solvent return conduit connecting said separator to said tank, a take-off conduit connecting said separator above the water level therein to an inlet of said carbon adsorber, a check valve in said last mentioned take-off conduit opening toward said carbon adsorber and closing toward said separator, a vapor and steam conduit connecting the inlet of said adsorber to the inlet of said condenser and provided with a check valve opening toward said condenser and closing toward said adsorber, a steam supply pipe connected to said filter for admitting steam thereto, an equalizer conduit connecting said tank above the solvent level therein to the inlet of said condenser, and means for optionally connecting said filter to said solvent vapor take-off conduit for delivering to the latter azeotropic solvent vapors evolved in said filter incident to admission of steam thereto.

12. In dry cleaning apparatus, a washer, a storage tank for chlorinated hydrocarbon solvent, means controlling the solvent level in said washer, a filter, a pump having its intake connected to said tank and its discharge connected to an inlet of said filter, a solvent return conduit connecting an outlet of said filter to said tank, a refill and discharge conduit connecting a bottom portion of said washer to said return conduit, a control valve in said return conduit between said tank and said refill and discharge conduit, a carbon adsorber, a suction means, an outlet conduit of said adsorber connected to said suction means, a check valve in said outlet conduit opening toward said suction means and closing toward said adsorber, means comprising an ejector in said outlet conduit between said check valve and said adsorber for optionally admitting steam to the latter, a water-solvent separator, a condenser having its outlet connected to said separator, a solvent vapor take-off conduit connecting said refill and discharge conduit to an inlet of said condenser, a check valve in said take-off conduit opening toward said condenser and closing toward said refill and take-off conduit, a solvent return conduit connecting said separator to said tank, a vapor and steam conduit connecting an inlet of said adsorber to the inlet of said condenser and provided with a check valve opening toward said condenser and closing toward said adsorber, a take-off conduit connecting said separator above the water level therein to the inlet of said carbon adsorber, a check valve in said last mentioned conduit opening toward said carbon adsorber and closing toward said separator, a steam supply pipe connected to said filter for admitting steam thereto, an equalizer conduit connecting said tank above the solvent level therein to the inlet of said condenser, and means for optionally connecting said filter to said solvent vapor take-off conduit for delivering to the latter azeotropic solvent vapors evolved in said filter incident to admission of steam thereto.

13. In dry cleaning apparatus, a washer, a storage tank for chlorinated hydrocarbon solvent immiscible with and of greater specific gravity than water, means for delivering solvent from said tank to said washer and returning it from the latter to said tank, and a wick member extending from the exterior of said tank into the latter to such an extent as to float on the solvent therein, said wick member being water absorbent and of a character when water wet to float on the solvent, whereby said wick member is effective for removing water from the upper surface of the solvent by capillarityy.

14. In dry cleaning apparatus, a washer, a storage tank for a chlorinated hydrocarbon solvent immiscible with and of greater specific gravity than water, means for delivering solvent from said tank to said washer and returning it from the latter to said tank, and a wick member extending from the exterior of said tank into the latter to such an extent as to float on the solvent therein, said wick member being water absorbent and of a character when water wet to float on the solvent, said wick member extending downwardly below said tank exteriorly thereof and having its lower portion immersed in water, said wick member being effective for removing water from the upper surface of the solvent by combined siphoning and capillarity.

15. In dry cleaning apparatus, a storage tank for a chlorinated hydrocarbon solvent immiscible with and of greater specific gravity than water, means for delivering solvent from said tank to said washer and returning it to said tank, a container positioned below said tank and exteriorly thereof, a tube connecting said container to said tank adjacent the top thereof, and a wick member positioned in said container below said tank and extending upward through said tube into said tank to an extent sufficient to float on the solvent therein, said wick member being water absorbent and of a character when water wet to float on the solvent.

16. In dry cleaning apparatus, a washer, a storage tank for a chlorinated hydrocarbon solvent immiscible with and of greater specific gravity than water, means for delivering solvent from said tank to said washer and returning it from the latter to said tank, and stationary capillary wick means having a portion floatable when water wet upon the solvent in the tank for continuously removing water from the top of the solvent within said tank and delivering it by capillary action to a place of discharge separated from the solvent in the tank.

17. In dry cleaning apparatus, a washer, a storage tank for a chlorinated hydrocarbon solvent immiscible with and of greater specific gravity than water, a filter and means for introducing filter powder therein, a pump having an inlet connected with said tank below the liquid level therein and means connecting an outlet of said pump for delivering solvent into said filter, means connecting an outlet of said filter with said washer and with said tank and means for selectively directing the filtered solvent from said filter to either the washer or the tank, and stationary capillary wick means having a portion floatable when water wet upon the solvent in said tank for continuously removing water from the top of the solvent within the tank and delivering it by capillary action to a place of discharge separated from the solvent in the tank.

DAN McDONALD.

References Cited in the file of this patent

UNITED STATES PATENTS

| Number | Name | Date |
|---|---|---|
| 1,410,230 | Wagner | Mar. 21, 1922 |
| 1,775,699 | Silver | Sept. 16, 1930 |
| 1,843,657 | Welles et al. | Feb. 2, 1932 |
| 2,011,083 | Sando | Aug. 18, 1935 |
| 2,117,273 | Brown | May 17, 1938 |
| 2,198,412 | McDonald | Apr. 23, 1940 |
| 2,359,138 | Martin | Sept. 26, 1944 |
| 2,574,251 | Dinley | Nov. 6, 1951 |